US010256917B2

United States Patent
Dolgin et al.

(10) Patent No.: US 10,256,917 B2
(45) Date of Patent: Apr. 9, 2019

(54) OPTICALLY SENSED DEMODULATION SYSTEMS AND METHODS FOR OPTICAL COMMUNICATIONS

(71) Applicant: RAYTHEON COMPANY, Waltham, MA (US)

(72) Inventors: Benjamin P. Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 59 days.

(21) Appl. No.: 15/717,736

(22) Filed: Sep. 27, 2017

(65) Prior Publication Data

US 2018/0091227 A1    Mar. 29, 2018

Related U.S. Application Data

(60) Provisional application No. 62/400,393, filed on Sep. 27, 2016.

(51) Int. Cl.
*H04B 10/61*   (2013.01)
*H04B 10/11*   (2013.01)
*H04B 10/556*  (2013.01)

(52) U.S. Cl.
CPC ........... *H04B 10/616* (2013.01); *H04B 10/11* (2013.01); *H04B 10/5561* (2013.01); *H04B 10/615* (2013.01)

(58) Field of Classification Search
CPC .. H04B 10/616; H04B 10/11; H04B 10/5561; H04B 10/615

(Continued)

(56) References Cited

U.S. PATENT DOCUMENTS 8,111,402 B2 *  2/2012  Le .................... G01N 21/7703
                                                    356/480
8,411,351 B2    4/2013  McCallion et al.

(Continued)

FOREIGN PATENT DOCUMENTS

JP         H0591047 A      4/1993

OTHER PUBLICATIONS

Arimoto et al., "High-speed free-space laser communication", Performance and Management of Complex Communications Networks, 1998, pp. 175-190.

(Continued)

*Primary Examiner* — Dalzid E Singh
(74) *Attorney, Agent, or Firm* — Lando & Anastasi, LLP

(57) ABSTRACT

Aspects are generally directed to receivers and methods for optically demodulating optical signals. In one example, a receiver includes an optical resonator to receive an optical signal, the optical resonator including an optical medium interposed between first and second semi-reflective surfaces, where the first and second semi-reflective surfaces are positioned to resonate optical signal energy, and the optical resonator is configured to disrupt the optical signal energy resonance responsive to a variation in the received optical signal. The receiver may further include a probe source positioned to provide an optical probe beam to the optical medium, the optical medium being configured to interrupt the optical probe beam during the optical signal energy resonance and to transmit at least a portion of the optical probe beam in response to the disruption of the optical signal energy resonance, and a detector to detect the transmitted portion of the optical probe beam.

19 Claims, 9 Drawing Sheets

(58) Field of Classification Search
USPC .......................................................... 398/202
See application file for complete search history.

(56) References Cited

U.S. PATENT DOCUMENTS

| | | | |
|---|---|---|---|
| 8,693,875 | B2 | 4/2014 | Banwell et al. |
| 2006/0013591 | A1 | 1/2006 | Rohde |
| 2007/0031150 | A1 | 2/2007 | Fisher et al. |
| 2008/0034866 | A1* | 2/2008 | Kilic .................. G01H 9/004 73/514.26 |
| 2008/0226300 | A1 | 9/2008 | Mayer et al. |
| 2008/0240736 | A1 | 10/2008 | Ji et al. |
| 2008/0266573 | A1 | 10/2008 | Choi et al. |
| 2011/0097085 | A1 | 4/2011 | Oda et al. |
| 2012/0121271 | A1 | 5/2012 | Wood |
| 2012/0269523 | A1 | 10/2012 | McCallion et al. |
| 2013/0272337 | A1 | 10/2013 | Tan et al. |
| 2013/0327145 | A1* | 12/2013 | Walker .................. G01P 15/006 73/514.09 |
| 2014/0314406 | A1 | 10/2014 | Zerbe et al. |
| 2015/0160257 | A1* | 6/2015 | Bulatowicz .......... G01P 15/093 73/514.26 |
| 2016/0013870 | A1 | 1/2016 | Sorin et al. |
| 2018/0054259 | A1 | 2/2018 | Kowalevicz et al. |
| 2018/0091228 | A1 | 3/2018 | Kowalevicz et al. |
| 2018/0091230 | A1 | 3/2018 | Dolgin et al. |
| 2018/0091232 | A1 | 3/2018 | Dolgin et al. |

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: http://www.dtic.mil/cgi-bin/GetTRDoc?Location=U2&doc=GetTRDoc.pdf&AD=ADA565323> and accessed on Nov. 17, 2017.

Juarez et al., "High-sensitivity DPSK receiver for high-bandwidth free-space optical communication links", Optics Express, vol. 19, May 2011, pp. 1-8.

Zhang, L. et al., "Microring-based Modulation and Demodulation of DPSK Signal" Optical Society of America, Optics Express, vol. 15, No. 18, Sep. 3, 2007.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

\* cited by examiner

OPTICALLY SENSED DEMODULATION SYSTEMS AND METHODS FOR OPTICAL COMMUNICATIONS

CROSS REFERENCE TO RELATED APPLICATION

This application claims priority under 35 U.S.C. § 119(e) to U.S. Provisional Application Ser. No. 62/400,393, titled "SYSTEMS AND METHODS FOR TWO-PHOTON DETECTION AND DEMODULATION OF OPTICAL COMMUNICATION SIGNALS," filed on Sep. 27, 2016, which is hereby incorporated herein by reference in its entirety.

BACKGROUND

Many optical communication systems manipulate light waves to carry information. For instance, often a light source (e.g., a laser source) is modulated to change various properties of emitted light, such as an amplitude, phase, frequency, or wavelength to convey information. In some cases, an underlying signal, such as a radio frequency signal, may be modulated via amplitude, phase, or frequency modulation, or any combination thereof, and the light source may be modulated by the underlying signal. An optical receiver may collect the light waves and measure properties or variations of the light wave, from which the underlying signal and the information may be recovered.

Optical signals with phase modulation formats have several advantages over amplitude modulation formats. However, when compared to typical amplitude modulation receivers, phase modulation receivers can be significantly more complex. Some examples of phase modulation receivers may include local oscillators, Fiber Bragg Gratings (FBG), and delay line interferometers (DLI). Generally, a phase modulation receiver collects a phase-encoded optical signal and performs one or more demodulation processes to convert the phase modulation into useful information. For example, this information may include communications information encoded in the phase modulation by a transmitter, information encoded in the phase modulation through interaction of the optical signal with an object, or other information about the source of the optical signal, the optical channel through which it traveled, and/or objects with which it interacted.

SUMMARY

Aspects and examples described herein provide systems and methods for demodulation of optical signals without a locally coherent clock source. In particular, certain examples of the systems described include an optical resonator configured to receive an optical signal and establish a steady-state energy-conserving condition in which the received optical signal accumulates or adds to build-up resonating optical signal energy inside the optical resonator. A variation in the phase, frequency, or amplitude of the received optical signal disrupts the optical signal energy resonating inside the optical resonator. In various examples, the optical resonator is provided with a probe beam that is interrupted (e.g., absorbed) by the optical resonator during the optical signal energy resonance, and transmitted by the optical resonator in response to one or more variations the arriving optical signal. Accordingly, various examples of the described systems may detect information encoded in the received optical signal based on one or more properties of the provided probe beam.

When compared to various known receivers, the described systems and methods increase the detectability of phase, frequency, or amplitude variations in a received optical signal.

Moreover, the examples of the systems and methods may be tuned to the wavelength of an optical carrier signal and therefore function over a broad range of modulation rates without the need to modify the characteristics of the receiver. That is, the systems and methods disclosed herein may provide the flexibility to accommodate various encoding techniques.

According to an aspect, provided is an optical signal receiver. In one example, the optical signal receiver comprises an optical resonator including a first semi-reflective surface positioned to receive an optical signal, a second semi-reflective surface positioned to face the first semi-reflective surface, and an optical medium interposed between the first semi-reflective surface and the second semi-reflective surface, the first semi-reflective surface and the second semi-reflective surface being positioned to resonate optical signal energy in the optical medium based at least in part on the received optical signal, where the optical resonator is configured to disrupt the optical signal energy resonance in response to a variation in the received optical signal, a probe source positioned to provide an optical probe beam to the optical medium, the optical medium being configured to interrupt the optical probe beam during the optical signal energy resonance and to transmit at least a portion of the optical probe beam in response to the disruption of the optical signal energy resonance, and a detector positioned to detect the portion of the optical probe beam transmitted by the optical medium.

According to another aspect, provided is a method of receiving information encoded in an optical signal. In at least one example, the method comprises receiving an optical signal at a first semi-reflective surface of an optical resonator, resonating optical signal energy in an optical medium interposed between the first semi-reflective surface and a second semi-reflective surface of the optical resonator, the second semi-reflective surface positioned to face the first semi-reflective surface, disrupting the optical signal energy resonance in response to a variation in the received optical signal, directing an optical probe beam to the optical medium, the optical medium interrupting the optical probe beam during the optical signal energy resonance and transmitting at least a portion of the optical probe beam in response to the disruption of the optical signal energy resonance, and detecting the portion of the optical probe beam transmitted by the optical medium.

According to an aspect, provided is an optical signal receiver. In one example, the optical signal receiver comprises an optical resonator configured to receive an optical signal and including an optical medium configured to produce optical signal energy resonance based at least in part on the received optical signal, the optical resonator being further configured to disrupt the optical signal energy resonance in response to a variation in the received optical signal, a probe source positioned to provide an optical probe beam to the optical medium, the optical medium being configured to interrupt the optical probe beam during the optical signal energy resonance and to transmit at least a portion of the optical probe beam in response to the disruption of the optical signal energy resonance, and a detector positioned to detect the portion of the optical probe beam transmitted by the optical medium.

According to various examples, the detector is further configured to determine a characteristic of the variation in the received optical signal based on detection of the portion of the optical probe beam transmitted by the optical medium. In at least one example, the detector is configured to determine the characteristic of the variation in the received optical signal based at least in part on a change in an intensity of the portion of the optical probe beam transmitted by the optical medium. In various examples, the change in the intensity of the portion of the optical probe beam transmitted by the optical medium is a temporary spike in the intensity. In some examples, the variation in the received optical signal is a variation in a phase of the received optical signal.

In various examples, the optical medium is a non-linear optical medium, the optical signal receiver further comprising a pump source coupled to the optical medium and configured to excite the optical medium to a threshold of non-linear absorption or non-linear interaction. According to various examples, the pump source is an optical source optically coupled to the optical medium and configured to direct a pump beam at the optical medium. In some examples, the pump beam is a pulsed pump beam.

According to various examples, the optical resonator is further configured to restore the optical signal energy resonance in response to a stabilization in the received optical signal, the optical medium being configured to interrupt the optical probe beam during the restored optical signal energy resonance. In at least some examples, the optical resonator further includes a first semi-reflective surface positioned to receive the optical signal, and a second semi-reflective surface positioned to face the first semi-reflective surface, where the optical medium is interposed between the first semi-reflective surface and the second semi-reflective surface, the first semi-reflective surface, the second semi-reflective surface, and the optical medium being configured to resonate optical signal energy in the optical medium based at least in part on the received optical signal such that the optical medium produces the optical signal energy resonance.

According to another aspect, provided is a method of receiving information encoded in an optical signal. In at least one example, the method comprises receiving an optical signal at an optical resonator, resonating optical signal energy in an optical medium of the optical resonator based at least in part on the received optical signal to produce an optical signal energy resonance, disrupting the optical signal energy resonance in response to a variation in the received optical signal, directing an optical probe beam to the optical medium, the optical medium interrupting the optical probe beam during the optical signal energy resonance and transmitting at least a portion of the optical probe beam in response to the disruption of the optical signal energy resonance, and detecting the portion of the optical probe beam transmitted by the optical medium.

In various examples, the method further comprises determining a characteristic of the variation in the received optical signal based on detection of the portion of the optical probe beam transmitted by the optical medium. In some examples, determining the characteristic of the variation in the received optical signal includes detecting a change in an intensity of the portion of the optical probe beam transmitted by the optical medium. In various examples, the change in the intensity of the portion of the optical probe beam transmitted by the optical medium is a temporary spike in the intensity. In some examples, the variation in the received optical signal is a variation in a phase of the received optical signal.

In various examples, the method further comprises exciting the optical medium to a threshold of non-linear absorption or non-linear interaction, the optical medium being a non-linear optical medium. In some examples, exciting the optical medium includes directing a pump beam at the optical medium with an optical source. In at least a few examples, the pump beam is a pulsed pump beam. According to various examples, the method further comprises restoring the optical signal energy resonance following the disruption to the optical signal energy resonance and in response to a stabilization in the received optical signal, the optical probe beam being interrupted by the optical medium during the restored optical signal energy resonance. Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
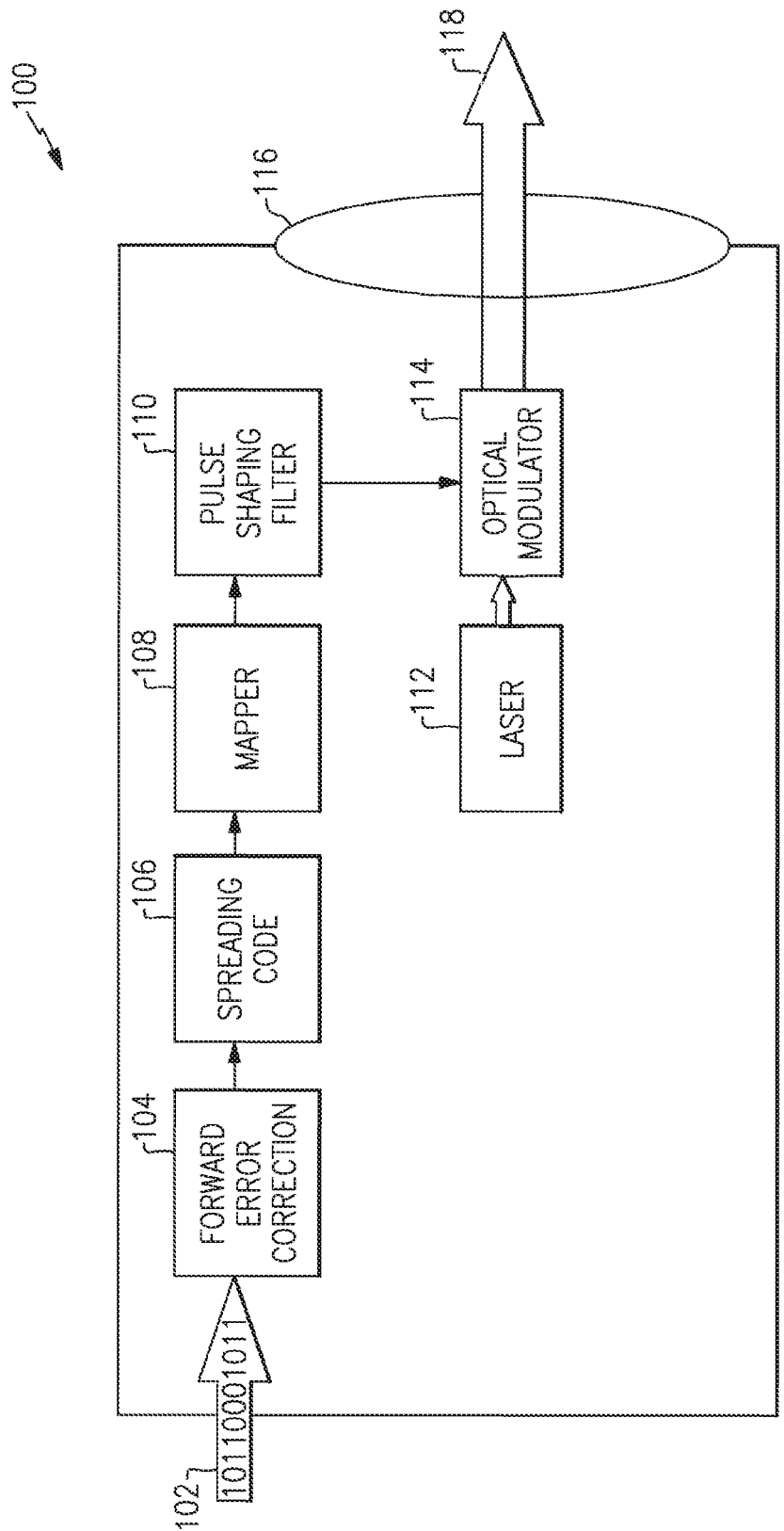
FIG. 1 is a block diagram of an optical transmitter for use with various examples described herein.

Aspects and examples described herein provide systems and methods for demodulation of phase-encoded (i.e., phase modulated) optical signals without a locally coherent clock source. In certain examples, the systems include an optical resonator, such as a Fabry-Perot filter/resonator, for converting a phase-encoded optical signal into an intensity-encoded optical signal. The intensity-encoded optical signal may be used to detect information encoded in the phase-encoded optical signal. In particular, the intensity-encoded optical signal may include a probe beam that is substantially interrupted (e.g., absorbed) by the optical resonator during a steady-state condition in which optical signal energy resonates inside the optical resonator, and transmitted by the optical resonator when the optical signal energy resonance is disrupted.

Phase encoded optical signals may come from numerous sources and/or be generated by numerous processes. Detection of a phase encoding may therefore be useful for many purposes. For instance, a coherent optical signal, such as a laser beam, may be modulated by a data communications transmitter to encode communicated information on an optical signal. However, other types of information, such as timing and/or time stamp information, may also be encoded as a phase modulation. Various processes phase modulate a coherent light source, and, accordingly, information about the process may be recovered by appropriate demodulation (e.g., interpreting) of the phase modulated optical signal. For example, various measurement systems may transmit an optical signal and analyze a reflected signal to determine dimensions, movement, defects, etc.

Some examples of typical phase modulation receivers include local oscillators, Fiber Bragg Gratings (FBG), and delay line interferometers. However, each of these receivers has significant drawbacks. In particular, these systems typically require components that are complex, large, and/or costly, and often have significant functional limitations. For example, many conventional approaches to phase modulation include a laser positioned within the receiver to convert a phase modulation to an amplitude modulation. However, these techniques require a highly stable laser having a narrow-line width. Another typical approach uses a FBG to convert the phase modulation to amplitude modulation, which requires an optical circulator element, thereby increasing the complexity, size, and cost. A further conventional approach uses a Mach-Zehnder delay line interferometer and is limited to a single communication data rate.

Examples of various systems for which demodulation of phase modulated optical signals may be beneficial include target designators, laser guidance systems, laser sight, laser scanners, 3D scanners, homing beacons and/or surveying systems, as well as communication systems. In at least some of these examples, an optical signal may arrive via a free space signal path (e.g., free space optical, FSO), a fiber coupling, or another waveguide system. Systems and methods for demodulation of phase modulated optical signals in accord with aspects and examples disclosed herein may be beneficially applied to any of the above example optical systems, or others, to receive, detect, recover, etc. useful information from an optical signal having phase encoding.

It is to be appreciated that embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space (e.g., a vacuum), or may be an atmospheric (e.g., air), or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics, to name a few examples.

Many optical receivers (e.g., coherent receivers) require a stable clock in order to accurately perform demodulation processes for a received signal, and may also require sophisticated optics such as 90-degree hybrids, phase shifters, and the like, especially when modulation includes encoding of information in polarization of the optical signal. In contrast, optical receivers (also referred to as "optical signal receivers") in accord with the aspects and examples disclosed herein do not require a local coherent clock source nor do they require significant optical components to achieve the same receiver capabilities as a conventional optical receiver. The benefits are achieved, at least in part, by an optical front-end that includes an optical resonator capable of detecting modulation transitions, such as phase variations, in a received optical signal without a coherent reference source. The optical resonator further transforms the modulation, e.g., phase modulation, into an intensity modulation that allows simplified processing, potentially in the electrical domain.

Figure 2:
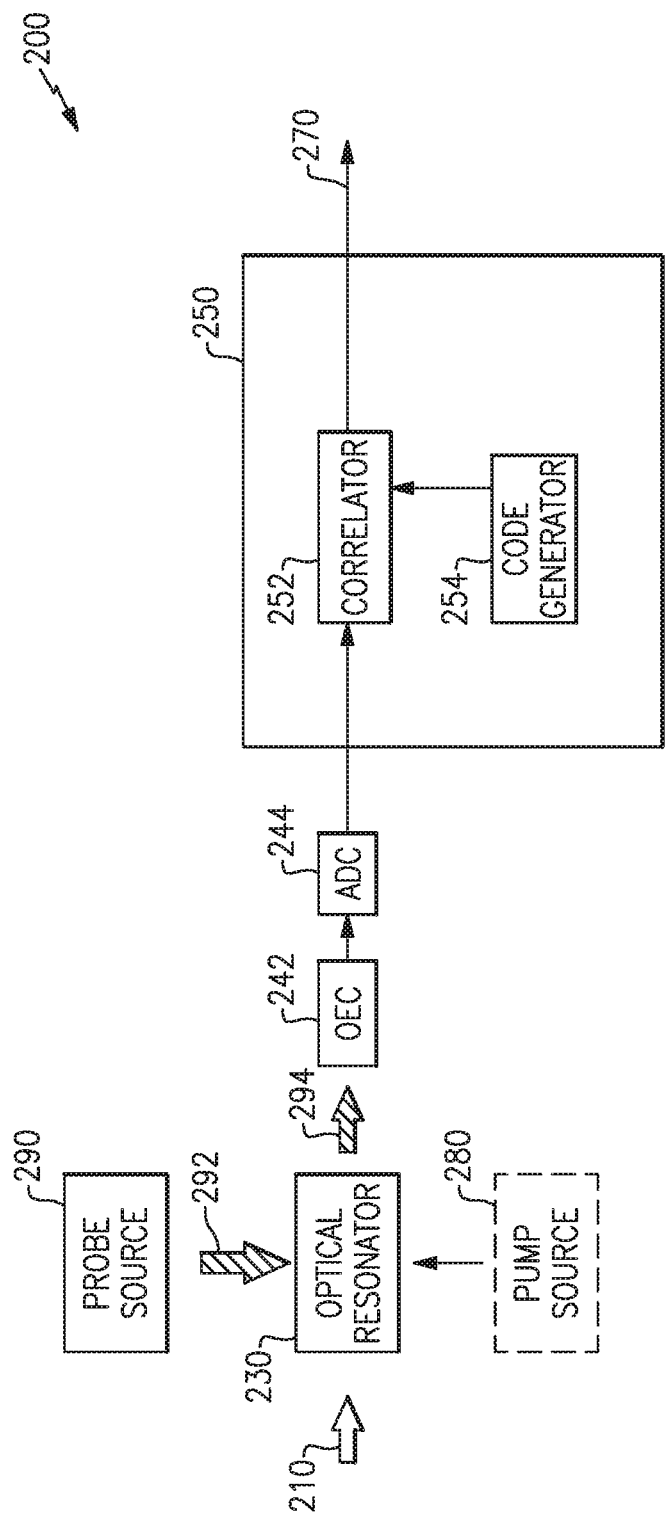
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 (also referred to herein as "optical signal transmitter" 100) shown in FIG. 1 and the optical receiver 200 (also referred to herein as "optical signal receiver" 200) shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., pre-defined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, a forward error correction (FEC) module 104, a spreading module 106, a mapping module 108, a pulse-shaping filter 110, an optical source (e.g., a laser) 112, a modulator 114, one or more optics 116, and an output 118 to provide an optical signal output. In the transmitter 100, the FEC module 104 implements forward error correction by adding redundancy to the received data payload with a block code or convolution code. For example, the FEC module 104 may repeat one or more bits within the data payload to reduce an effect that the transmission medium may have on the transmitted signal waveform. Accordingly, in various examples the optical transmitter 100 may include a FEC module 104 to control errors that may result from transmitting the data payload through a noisy or lossy medium. Following the FEC module 104, the data payload is provided to the spreading module 106.

The transmitter 100 includes a spreading module 106 that applies a spreading code to the data payload. The spreading code is useful for identifying and processing signal components in the receiver, and reduces the effects of inter-symbol interference (ISI). For example, the spreading module 106 may include a pseudo-random code generator (PRCG) and may apply direct sequence spread spectrum (DSSS) techniques, while other examples of transmitters or spreading modules may apply other forms of spreading. The mapping module 108 receives the data payload from the spreading module 106 and maps the data payload to a particular modulation scheme. For instance, the mapping module 108 may map the data payload to various positions of a particular phase and amplitude constellation, depending upon the types of modulation used by the transmitter, e.g., phase, amplitude, frequency, or any combination thereof.

A pulse-shaping filter 110 may receive an output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data payload to encode those symbols on the carrier waveform. The transmitter 100 may also include one or more optics 116, such as one or more mirrors or lenses, which direct the optical signal at the output 118. Specifically, the one or more optics 116 may be used to direct the optical signal in a direction of an optical receiver (e.g., the optical receiver 200 illustrated in FIG. 2).

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. For instance, the optical receiver 200 may receive an optical signal transmitted along a free space signal path (e.g., free space optical, FSO), a fiber coupling, or another waveguide system by the optical transmitter 100 of FIG. 1. In various examples, the optical receiver 200 may be paired together with the optical transmitter 100 to form a bidirectional data communication system (e.g., a transceiver). The transceiver may be capable of bidirectional data communication with another transmitter/receiver pair.

As illustrated in FIG. 2, the optical receiver includes an optical resonator 230, an optical-electrical converter (OEC) 242, an analog to digital converter 244, a probe source 290, and a digital processing subsystem 250. In some examples, the optical receiver 200 may also include a pump source 280. As discussed herein, the OEC 242, analog to digital converter 244, and digital processing subsystem 250 may be collectively referred to as a detector. However, in various other examples, the OEC 242, analog to digital converter 244, and digital processing subsystem 250 may be separate components.

The optical resonator 230 is positioned to receive an optical signal 210 and a probe beam 292 and may be coupled to the components of the detector, such as the digital processing subsystem 250, by the optical-electrical converter 242 and the analog to digital converter 244. The digital processing subsystem 250 is configured to provide an output 270 to one or more downstream components based on the received probe beam 292 and/or one or more characteristics of the received optical signal, such as a phase transition in the optical signal 210.

Examples of optical resonators 230 may include Fabry-Perot etalons, micro-rings, or other types of resonators. The optical resonator 230 is an optical component capable of sensing variations, such as phase variations, in the received optical signal 210, and generating a corresponding output 294. As further discussed below with reference to at least FIGS. 3A and 3B, the variations in the optical signal 210 are representative of a modulation performed at the transmitter (e.g., the optical transmitter 100 of FIG. 1) and, therefore, may be representative of information encoded on the received optical signal 210. In various examples, a variation in the arriving phase, frequency, or amplitude of the optical signal 210 may disrupt the operation of optical resonator 230, and, accordingly, affect the output 294. As such, a change in phase, frequency, or amplitude of the arriving optical signal 210 causes a detectable change in the output 294 of the optical resonator 230. As further discussed below with reference to at least FIGS. 3A and 3B, in many instances, the output 294 of the optical resonator 230 is an intensity encoded output optical probe beam.

In various examples, the output 294 is directed to the OEC 242. The OEC 242 converts the emerging output 294 into an electrical signal. For example, the OEC 242 may include a photodetector, such as a photodiode. In an example in which the output 294 is an intensity-modulated output, the OEC 242 may produce an amplitude modulated signal representative of the intensity-modulated output. The amplitude modulated signal representative of the intensity-modulated output may be converted to a digital form by the analog to digital converter 244. The digital signal is provided to the digital processing subsystem 250 for digital processing. The digital processing subsystem 250 processes the digital signal to recover the information-carrying content of the optical signal 210. The basic operation of the digital processing subsystem 250 is known in the art, and may include, e.g., a correlator 252 and a code generator 254, but the details of any particular implementation may vary.

In various examples, a receiver in accord with aspects and examples disclosed herein may include additional or fewer optics than discussed above, and may omit or add various components relative to those discussed above. For example, focusing optics may be included to receive the emerging output 294 from the optical resonator 230 and to focus the output 294 on the OEC 242. In certain examples, the receiver 200 may also include one or more optics that collect and direct the optical signal 210 to the optical resonator 230. Certain examples of the receivers described herein may also use analog receiver circuitry and therefore may omit one or more of the analog to digital converters 224. Various examples may include a channel estimator as part of the digital processing subsystem 250 to provide phase rotation or other signal adjustments as may be known in the art.

Figure 3A:
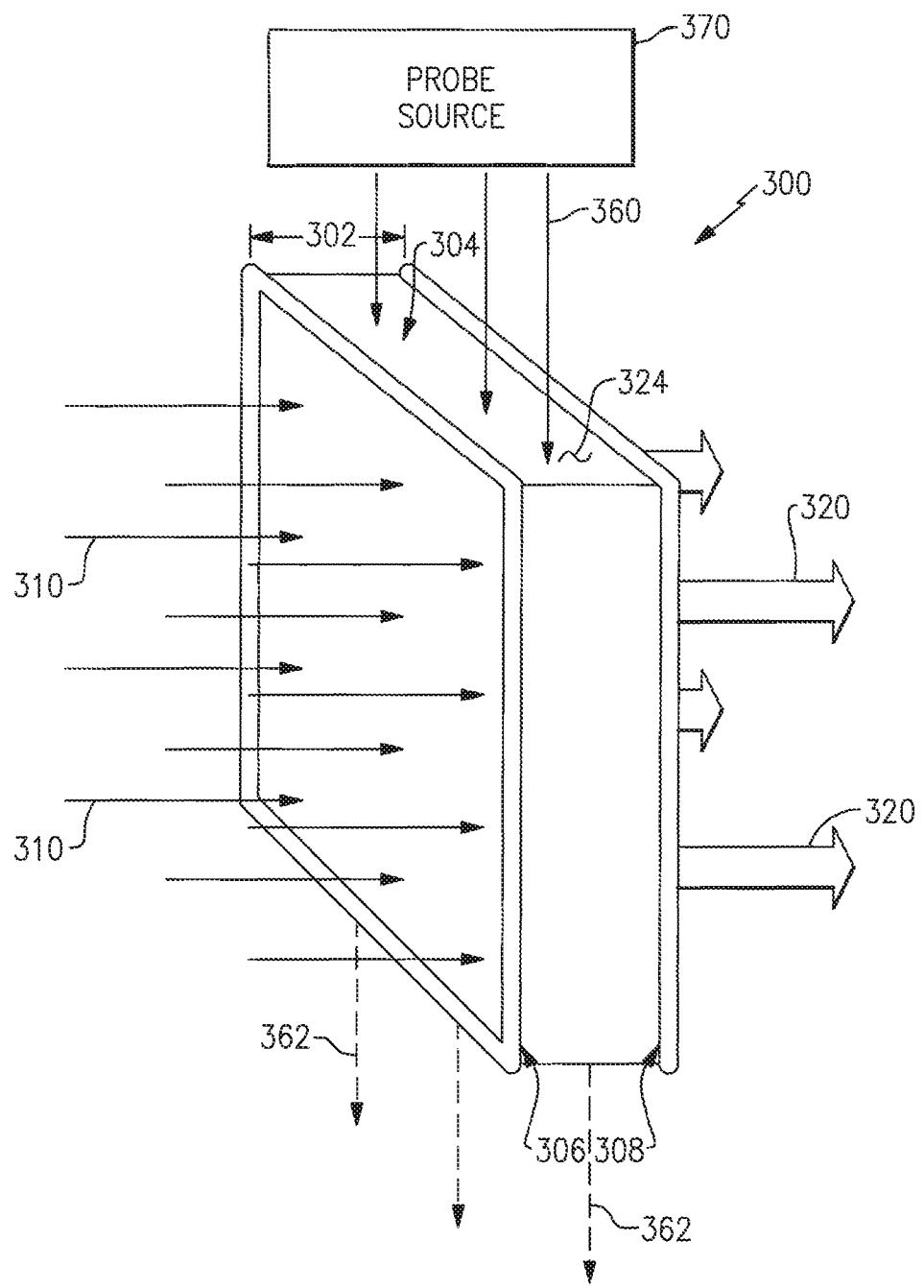
FIG. 3A illustrates an optical resonator receiving a probe beam, according to various examples described herein.
Figure 3B:
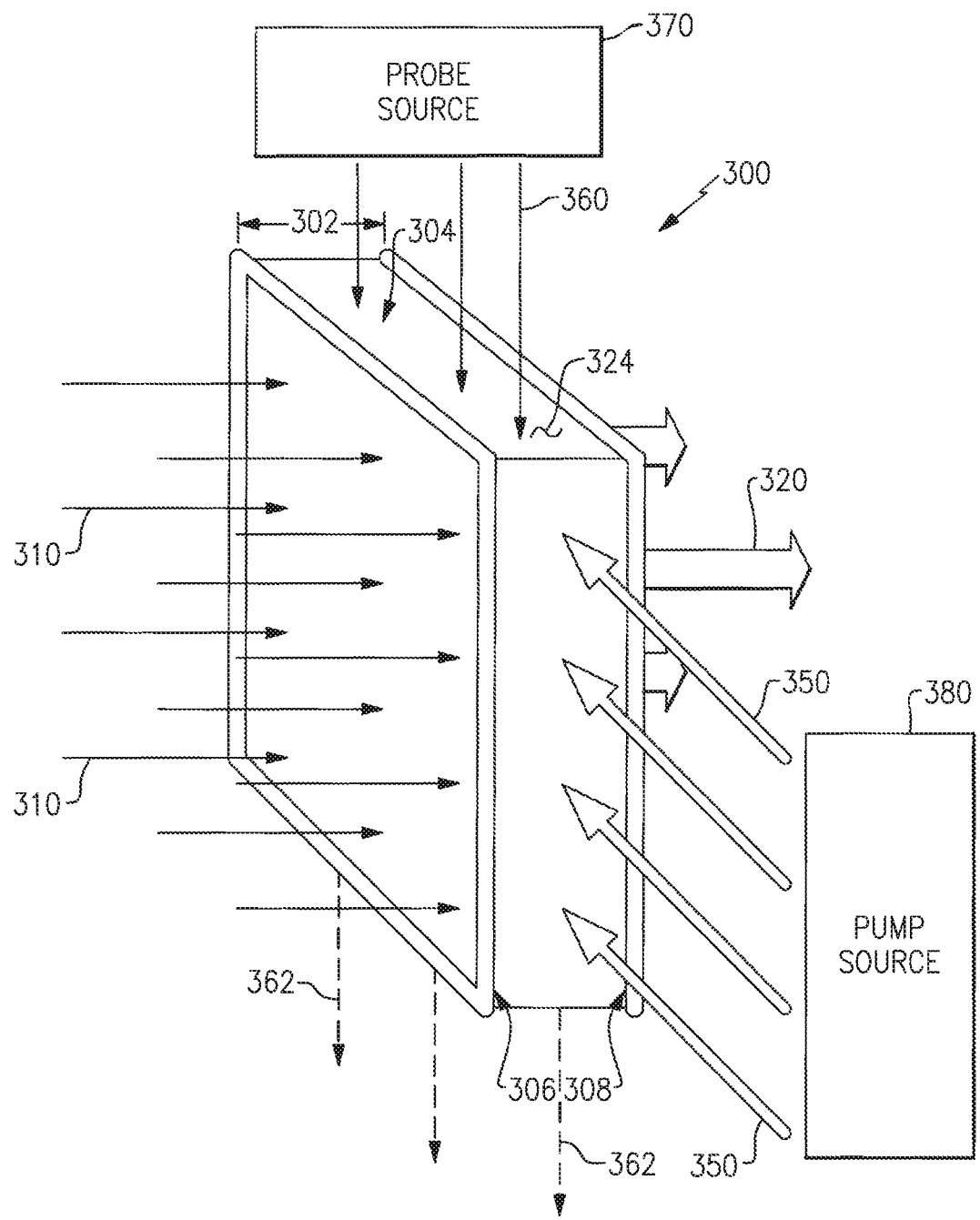
FIG. 3B illustrates an optical resonator receiving a probe beam and a pump beam, according to various examples described herein.

FIGS. 3A and 3B illustrate an example of an optical resonator 300, and in particular an etalon, which may be used in various examples of an optical receiver in accord with aspects and examples described herein. For instance, the optical resonator 300 illustrated in FIGS. 3A and 3B may be used as the optical resonator 230 illustrated and described with reference to at least FIG. 2.

The use of the term "etalon" throughout this disclosure is not intended to be limiting and as used herein may include any of multiple structures, including plates with reflecting surfaces as well as parallel mirrors with various optical materials positioned in-between, and in particular examples, with active optical materials positioned in-between. The spacing between the reflecting surfaces of an optical resonator (e.g., optical resonator 230 shown in FIG. 2 or optical resonator 300 shown in FIG. 3) may be referred to herein as a cavity, but is not so limited. That is, the optical resonators may include other structures, such micro-ring resonators, interferometers and the like. Additionally, etalon structures may be formed as a laminate, layer, film, coating, or the like.

In some examples, an optical resonator (e.g., an etalon) may include reflective surfaces (including semi-reflective surfaces) that are not co-planar and/or are not co-linear. For example, an interior reflective surface of an optical resonator may include some curvature, and an opposing surface may also be curved such that a distance between the two surfaces is substantially constant across various regions of the optical resonator, in some examples. In other examples, an optical resonator may have non-linear or non-planar surfaces with varying distances between the surfaces at various regions, and may still function as an optical resonator for various wavelengths and at various regions, suitable for use in examples discussed herein. Accordingly, an optical resonator may be purposefully designed to conform to a surface, or to have various regions responsive to differing wavelengths, or responsive to differing angles of arrival for a given wavelength, in certain examples.

As shown in both FIG. 3A and FIG. 3B, the optical resonator 300 may include a first semi-reflective surface 306 positioned in optical communication with a second semi-reflective surface 308. In particular, in FIGS. 3A and 3B the optical resonator 300 includes a first semi-reflective surface 306 positioned substantially parallel and facing a second semi-reflective surface 308 with a semi-transparent optical medium 324 interposed there between. The optical resonator 300 may have one or more characteristic resonant frequencies, each associated with a certain wavelength of light, based upon the spacing (i.e., dimensional length 302) between the semi-reflective surfaces 306, 308. In some examples, the surfaces are semi-reflective and also semi-transmissive, in that they allow some light through. Accordingly, an arriving optical signal 310 may be allowed into the optical resonator 300 (i.e., between the pair of semi-reflective surfaces 306, 308) and may resonate inside the optical resonator 300 and between the pair of semi-reflective surfaces 306, 308. Additionally, some of the resonating optical signal energy inside the optical resonator 300 is emitted out of the optical resonator 300 through one of the semi-transmissive surfaces 306, 308.

Accordingly, the optical resonator 300 may be designed to have a resonant frequency aligned with the source of the received optical communication signal 310 (e.g., the optical transmitter 100 shown in FIG. 1). In various examples, the dimensional scale (e.g., length 302) of the optical resonator 300 is selected such that the optical resonator 300 exhibits optical resonance at the wavelength of the received optical communication signal 310. In certain examples, such dimensional scales are much shorter than the length of a transmitted symbol, which is the distance traveled by the optical signal 310 between transitions that convey information, e.g., between phase changes in a phase modulated signal.

As illustrated in FIGS. 3A and 3B, in various examples the optical resonator 300 may include an interior 304 (e.g., a cavity) that is defined by the first-semi reflective surface 306 and the second semi-reflective surface 308. The first semi-reflective surface 306 is positioned substantially parallel and facing the second semi-reflective surface 308 such that the optical signal 310 received by the optical resonator 300 establishes a steady-state energy-preserving condition in which the optical signal 310 accumulates or adds to build-up resonating optical signal energy inside the optical resonator 300. As illustrated in FIGS. 3A and 3B, in various examples, each of the first and second semi-reflective surfaces 306, 308 are substantially planar. However, in other examples, other arrangements and surface curvatures may be used. Moreover, while shown in FIGS. 3A and 3B as two separate structures (e.g., two individual plates), in certain other examples, the first semi-reflective surface 306 and the second semi-reflective surface 308 may be two different surfaces of a single structure (e.g., two opposing sides of the same structure).

As discussed, the first semi-reflective surface 306 and the second semi-reflective surface 308 may each also be semi-transmissive. Accordingly, one of the first semi-reflective surface 306 and the second semi-reflective surface 308 may form an entrance aperture (shown as the first semi-reflective surface 306 in FIGS. 3A and 3B) through which the arriving optical communication signal 310 is received and directed into the inside 304 of the optical resonator 300. The other of the first semi-reflective surface 306 and the second semi-reflective surface 308 (shown as second the semi-reflective surface 308 in FIGS. 3A and 3B) forms an optical output from which output optical signal energy 320 is emitted. That is, the second semi-reflective surface 308 allows a portion of the trapped resonating optical signal energy from the interior 304 to emerge as the output optical signal energy 320. Accordingly, the second semi-reflective surface 308 is semi-transmissive such that optical signal energy arriving at the second semi-reflective surface 308 is partially reflected back to the interior 304 and partially transmitted through the output.

The optical resonator 300 further includes the optical medium 324 inside the optical resonator 300 and interposed between the first semi-reflective surface 306 and the second semi-reflective surface 308. The optical signal energy resonating between the first semi-reflective surface 306 and the second semi-reflective surface 308 propagates through the optical medium 324. While shown in FIGS. 3A and 3B as being composed of a single material, in certain other examples, the optical medium 324 may include multiple layers of the same material or different materials. In particular examples, the optical medium 324 may include a non-linear optical medium that experiences non-linear absorption as further described herein.

The first semi-reflective surface 306 and the second semi-reflective surface may have varying levels of reflectivity and transmissive characteristics. In certain examples, the reflectivity may be expressed as a fraction of light amplitude reflected back into the optical medium 324 (e.g., back into the interior 304 of the optical resonator 300), or may be expressed as a fraction of light intensity reflected back into the optical medium 324 (e.g., back into the interior 304 of the optical resonator 300). In a particular example, an amplitude reflectivity of the first semi-reflective surface 306 may be $r_1=0.999$ and an amplitude reflectivity of the second semi-reflective surface 308 may be $r_2=0.985$. In other examples the reflectivity of each of the first and second semi-reflective surfaces 306, 308 may be different, and may be any suitable value for a particular implementation. The optical resonator 300 is one example of a suitable optical resonator in accord with aspects and examples described herein.

In various examples, the optical resonator 300 may be used to convert phase, frequency, or amplitude modulations of the received optical communication signal 310 into intensity or amplitude modulations of an output. For instance, a variation in the arriving phase, frequency, or amplitude of the optical signal 310 may disrupt the optical signal energy resonating inside the optical resonator 300, and, accordingly, disturb the output optical signal energy 320. Following the variation in the optical signal 310, the optical signal 310 re-accumulates to restore the resonating optical signal energy inside the optical resonator 300 and return the optical resonator 300 to the steady-state condition. Once the steady-state condition is re-established (i.e., the optical signal 310 arrives at a constant rate without a variation), the output optical signal energy 320 returns to the corresponding constant rate.

As such, the emerging output optical signal energy 320 intensity may be tracked to detect one or more changes in phase, frequency, or amplitude of the arriving signal 310. However, phase transitions in the arriving optical signal 310 cause only a temporary intensity reduction in the emerging output optical signal energy 320. In some situations, these temporary reductions in intensity may be challenging or problematic to detect.

To address this challenge, in various examples, an arrangement is provided in which a change in phase, frequency, or amplitude of the arriving optical signal 310 is converted to an intensity-encoded output optical probe beam 362. As illustrated in FIGS. 3A and 3B, a probe source 370 may be positioned to provide an optical probe beam 360 to the optical resonator 300, and in certain examples, the optical medium 324. For instance, the probe source 370 may include a laser source, or other suitable optical source, positioned to direct a continuous laser probe beam 360 at the optical medium 324. When the optical resonator 300 is in the steady-state condition, the received optical probe beam 360 causes a non-linear absorption process to occur at the optical resonator 300 (e.g., at the optical medium 324). As a result of the non-linear absorption process, the optical medium 324 absorbs all, or most of, the optical probe beam 360. However, when a variation in the received optical signal 310 occurs, such as a phase transition in the received optical signal 310, the non-linear absorption process of the optical medium 324 is disrupted, and at least a portion of the optical probe beam 360 is emitted (e.g., transmitted) by the optical medium 324. As discussed herein, the portion of the optical probe beam 360 transmitted by the optical medium 324 is referred to as the "output optical probe beam" 362. The modulated output optical probe beam 362 may then be converted to an electrical signal by a detector (not shown in FIGS. 3A and 3B), where corresponding amplitude variations are representative of the phase modulation of the received optical signal 310.

As shown in FIGS. 3A and 3B, the optical probe beam 360 may be directed at the optical medium 324 via free space, a waveguide, one or more optics, or a fiber coupling. For instance, FIGS. 3A and 3B illustrate the optical probe beam 360 incident on the optical medium 324 at about an orthogonal angle (e.g., about a 90 degree angle). However, in other examples, the optical probe beam 360 may be directed to the optical medium 324 at other angles and in other orientations. The arrangement shown in FIGS. 3A and 3B is merely for the convenience of illustration.

In various examples, the optical medium 324 consists of one or more materials that are substantially transparent to the optical probe beam 360 when the intensity of the resonating optical signal energy is at a low level. In contrast, the one or more materials of the optical medium 324 increasingly interrupt (e.g., increasingly absorb) the optical probe beam 360 as the resonating optical signal energy intensity increases (i.e., as the optical resonator 300 approaches the steady-state energy-preserving condition). For instance, the optical medium 324 may include a non-linear optical medium composed of one or more non-linear materials, such as a doped glass, a non-linear crystal material, or a semiconductor material. In various examples, the particular material or materials of the optical medium 324 may be selected based on the properties of the received optical signal 310 and/or the optical probe beam 360. For instance, the optical medium 324 may have an absorption band and an emission band, where the active optical medium 324 is selected such that the emission band encompasses a wavelength of the received optical signal 310. However, in other examples, the properties of the optical probe beam 360 may be tuned based on the particular material or materials of the optical medium 324 and/or the properties of the received optical signal 310. For instance, an intensity of the probe beam 360 may be selected such that the optical medium 324 is slightly above a threshold for non-linear absorption when the resonator 300 is in the steady-state condition.

In particular examples, the optical medium 324 is composed of one or more materials that experience a two-photon absorption processes in response to receiving at least the optical signal 310 and the optical probe beam 360. In one such example the optical medium 324 is a semiconductor material. As discussed herein, and as will be appreciated by one of ordinary skill in the art, two-photon absorption is a non-linear optical absorption process during which two photons excite a molecule from a ground state to a high energy state. The difference in the energy of the molecule between the ground state and the high energy state is the sum of the two photon energies. As a result of the two-photon absorption process, the rate of absorption of the optical probe beam 360, by the optical medium 324, increases as the optical resonator 300 approaches the steady-state condition (i.e., optical signal energy resonance), and decreases as the optical resonator 300 moves away from the steady-state condition.

In various examples, when the optical resonator 300 is at the steady-state energy-preserving condition (i.e., the received optical signal 310 accumulates or adds to build-up resonating optical signal energy inside the optical resonator 300) a first photon of the received optical signal 310 is available to cause a molecule of the optical medium 324 to transition to a "virtual" state. In response to receiving the optical probe beam 360, a second photon of the optical probe beam 360 causes the molecule to transition to a high energy state. In this manner, the optical probe beam 360 is absorbed by the optical medium 324 when the optical signal energy is resonating within the optical resonator 300. Described in another way, when the optical signal 310 received by the optical resonator 300 is continuous and unchanging, the optical resonator 300 is in the steady-state condition, and the received energy of the optical probe beam 360 initiates a non-linear absorption process in the optical medium 324 that absorbs all, or most of, the optical probe beam 360 (i.e., as a result of two-photon absorption).

However, when a variation in the received optical signal 310 occurs, such as a phase transition in the received optical signal 310, the non-linear absorption process is disrupted, and at least a portion of the optical probe beam 360 is emitted (e.g., transmitted) by the optical medium 324. That is, the molecule of the optical medium 324 is no longer transitioned to the high energy state. As such, disruptions to the resonance of optical signal energy within the optical resonator 300 cause disruptions in the non-linear absorption process of the optical medium 324, and accordingly, create amplitude (or intensity) variations in a transmitted portion of the received optical probe beam (referred to as the "output optical probe beam" 362). Accordingly, various examples of the optical receiver described herein may be referred to as a two-photon absorption receiver because of the non-linear absorption process that occurs at the optical medium 324. It is appreciated that while described herein as a non-linear absorption process, in fact, in certain implementations the probe beam 360 may interact within the optical medium 324 to produce light of a different wavelength instead of being directly absorbed by the optical medium 324. Accordingly, in many examples the probe beam 360 is described as being interrupted by being "absorbed" merely for the convenience of description, and in fact, may actually undergo a non-linear interaction to deplete the probe beam 360 within the optical medium 324. For instance, this may be the case when the optical medium 324 is a non-linear crystal material. For example, when the optical signal energy is resonating within the optical resonator 300 (i.e., the resonator 300 is in the steady-state condition) the resonating optical signal energy and the probe beam 360 undergo a non-linear interaction to produce light of a different wavelength, thereby depleting (e.g., interrupting) the probe beam 360. However, when a variation in the received optical signal 310 occurs, such as a phase transition in the received optical signal 310, the non-linear interaction is not initiated, and at least a portion of the probe beam 360 is transmitted. The rate of interaction between the optical probe beam 360 and the resonating optical signal energy increases as the optical resonator 300 approaches the steady-state condition (i.e., optical signal energy resonance), and decreases as the optical resonator 300 moves away from the steady-state condition.

Figure 4A:
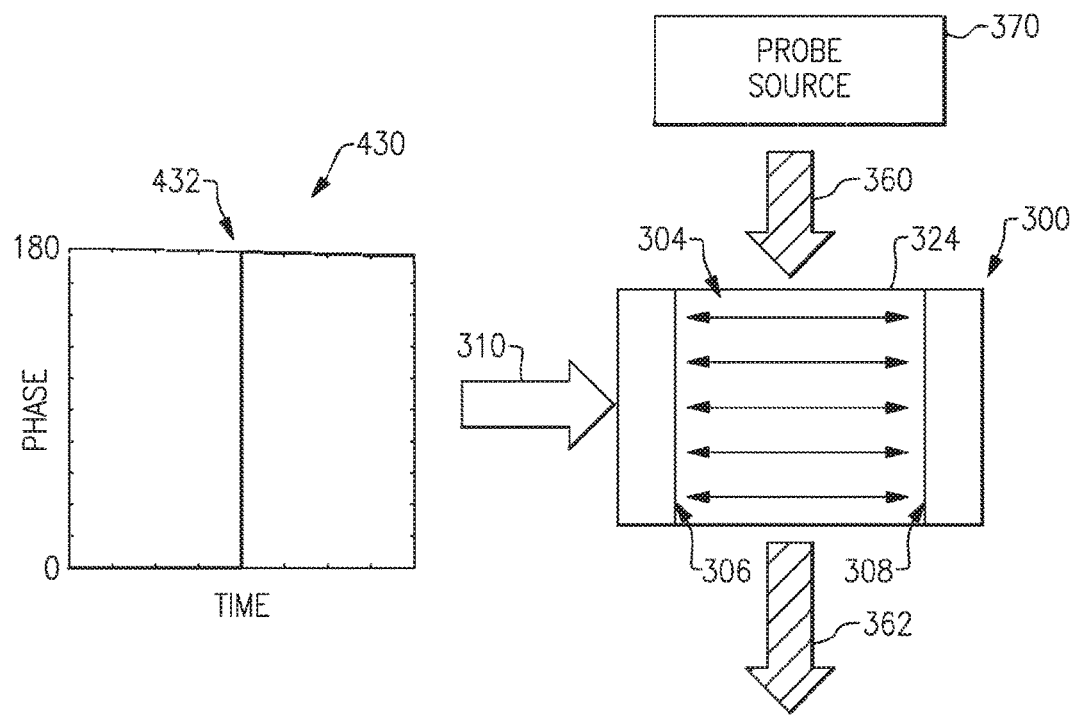
FIG. 4A is a schematic diagram of the optical resonator illustrated in FIG. 3A, including a graph of received signal phase and a graph of output intensity of the probe beam, according to various examples described herein.
Figure 4A:
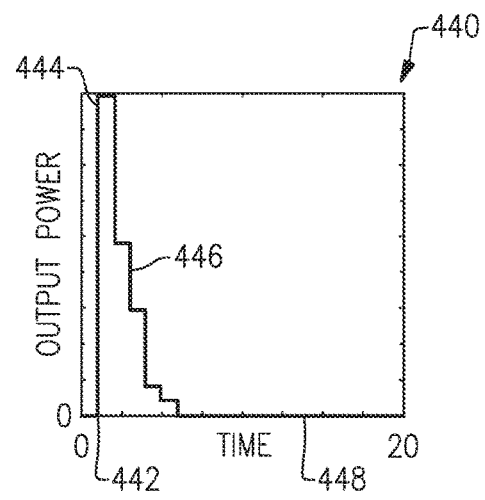

Referring to FIG. 4A, illustrated is a schematic diagram of the optical resonator 300 illustrated in FIG. 3A. FIG. 4A includes a graph of a phase of the received optical signal 310 and a graph of an output intensity of the output optical probe beam 362. As discussed herein, the optical medium 324 of optical resonator 300 continuously interrupts (e.g., absorbs) the received optical probe beam 360 based on a non-linear process until a variation (e.g., a modulation in phase) in the received optical signal 310 occurs. When a phase modulation occurs in the received optical signal 310, disrupted resonance inside the optical resonator 300 causes a disruption in the non-linear process, and a least a portion of the received optical probe beam 360 is transmitted by the optical medium 324 (shown as output optical probe beam 362). That is, the disrupted resonance inside the optical resonator 300 causes a phase-dependent change in the amplitude of the output optical probe beam 362. This can be seen in the input phase plot 430 and the output power plot 440 illustrated in FIG. 4A.

Accordingly, a received phase encoded optical communication signal, such as received optical signal 310, is converted to an amplitude varying signal, such as the output optical probe beam 362, by the optical resonator 300. The output optical probe beam 362 is suitable for direct detection by a sensor, such as the OEC 242 illustrated and described with reference to FIG. 2. Additionally, the optical resonator 300 will function over a broad range of data rates without the need to modify the optical characteristics of the system, such as detector setup, path length adjustments, delay elements, or the like. For example, the ability of the optical resonator 300 to convert an arriving phase modulated input optical signal 310 into an intensity modulated output optical probe beam 362 may be independent of the modulation rate at which the input phase is changing, in some examples.

The input phase plot 430 illustrates a phase transition 432 in the received optical signal 310. At point 442 of the output power plot 440 the optical resonator 300 is in a steady-state condition in which the optical probe beam 360 is interrupted (e.g., absorbed) by the optical medium 324 and the intensity of output optical probe beam 362 is about at a zero value. At point 444, a phase transition 432 occurs in the arriving optical signal 310, temporarily disrupting the steady-state and causing an increase in the intensity of the output optical probe beam 362. That is, the phase change in the arriving optical signal 310 appears as a temporary intensity spike (e.g., increase) in the intensity of the output optical probe beam 362. During successive reflections inside the optical resonator 300 (e.g., accumulation of the resonating optical signal energy), labeled at point 446, resonance is re-established and the emerging light intensity of the output optical probe beam 362 decreases until, at point 448, the intensity of output optical probe beam 362 is about at a zero value. In particular, the output optical probe beam 362 is at about the zero value when the resonator 300 has been restored to the steady-state condition.

Accordingly, an increase in the emerging light intensity of the output optical probe beam 362 indicates that a variation occurred in the arriving optical signal 310. As discussed, this variation may be a variation in a phase, frequency, or amplitude of the received optical signal 310. As such, intensity spikes in the output optical probe beam 362 may be used by appropriate signal processing components (e.g., a detector) to determine useful information. In the example discussed above and illustrated by FIG. 3A, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an optical resonator (e.g., an etalon) tuned to the wavelength of the received optical signal 310 reacts to a phase variation in the optical signal 310 in accord with the discussion above, and as illustrated in FIG. 4A. If the arriving optical signal 310 is modulated with binary phase shift keying (BPSK), for example, the output illustrated in FIG. 4A indicates each phase shift, and accordingly the information carried in the phase shift keying may be recovered from the intensity variations in the output optical probe beam 362. It should be understood by those of skill in the art with the benefit of this disclosure, that such information recovery is achieved without the necessity for a local coherent clock source to demodulate the arriving optical signal 310.

Referring to FIG. 3B, in various examples, the optical medium 324 may be coupled to a pump source 380. For instance, the pump source 380 may be used as the pump source 280 illustrated and described with reference to at least FIG. 2. The pump source 280 is configured to excite the optical medium 324 to generate an optical gain in the received optical signal 310. That is, the one or more material layers of the optical medium 324 may, when excited, amplify the received optical signal 310, and accordingly, amplify the resonating optical signal energy inside the optical resonator 300. In various examples, the pump source is configured to excite the optical medium 324 to a threshold of the non-linear absorption process. FIG. 3B illustrates the optical medium 324 receiving an optical pump beam 350 to excite the optical medium 324. While in one example, the optical medium 324 may be excited by an optical pump source, such as a laser source, in other examples, the optical medium 324 may be responsive to other forms of excitation, such as an electrical current, an electrical voltage, or a mechanical excitation (e.g., e.g., displacement).

The optical medium 324 may produce the optical gain while receiving the excitation (e.g., while receiving the optical pump signal 350), and may provide no optical gain in the absence of the excitation. Accordingly, in some examples, the optical medium 324 may be selectively and/or dynamically controlled to selectively provide and control the application of the optical gain. For instance, in at least one example, the pump source may provide a pulsed optical pump beam. The pulsed optical pump beam may be pulsed between a substantially zero value and a predetermined target value at a constant rate of repetition. In some examples, the first-semi reflective surface 306 and second semi-reflective surface 308 may be at least partially reflective to the optical pump beam 350, and may reflect at least a portion of the optical pump beam 350 within the optical resonator 300. Such an implementation would ensure a uniform illumination (e.g., excitation) of the optical medium 324.

In addition to reducing the power consumption of the associated optical receiver, in various examples, a pulsed optical pump beam may be synchronized with the received optical signal 310 such that an increase in the intensity of the output optical probe beam 362 (e.g., as a result of a phase change in the received optical signal 310) occurs coincident with a pulse of the pulsed optical pump beam. That is, the pulsed optical pump beam may be synchronized with the received optical signal 310 such that a rising edge of a pulse of the optical pump beam correlates with the disruption of resonating optical signal energy within the optical resonator 300. Accordingly, in various examples, the output optical probe beam 362 is a convolution of the optical pump beam 350 and the optical probe beam 360. The effect of this synchronization results in an increase in the "sharpness" of the return of the output optical probe beam 362 to the zero value following the variation in the received optical signal 310.

Figure 4B:
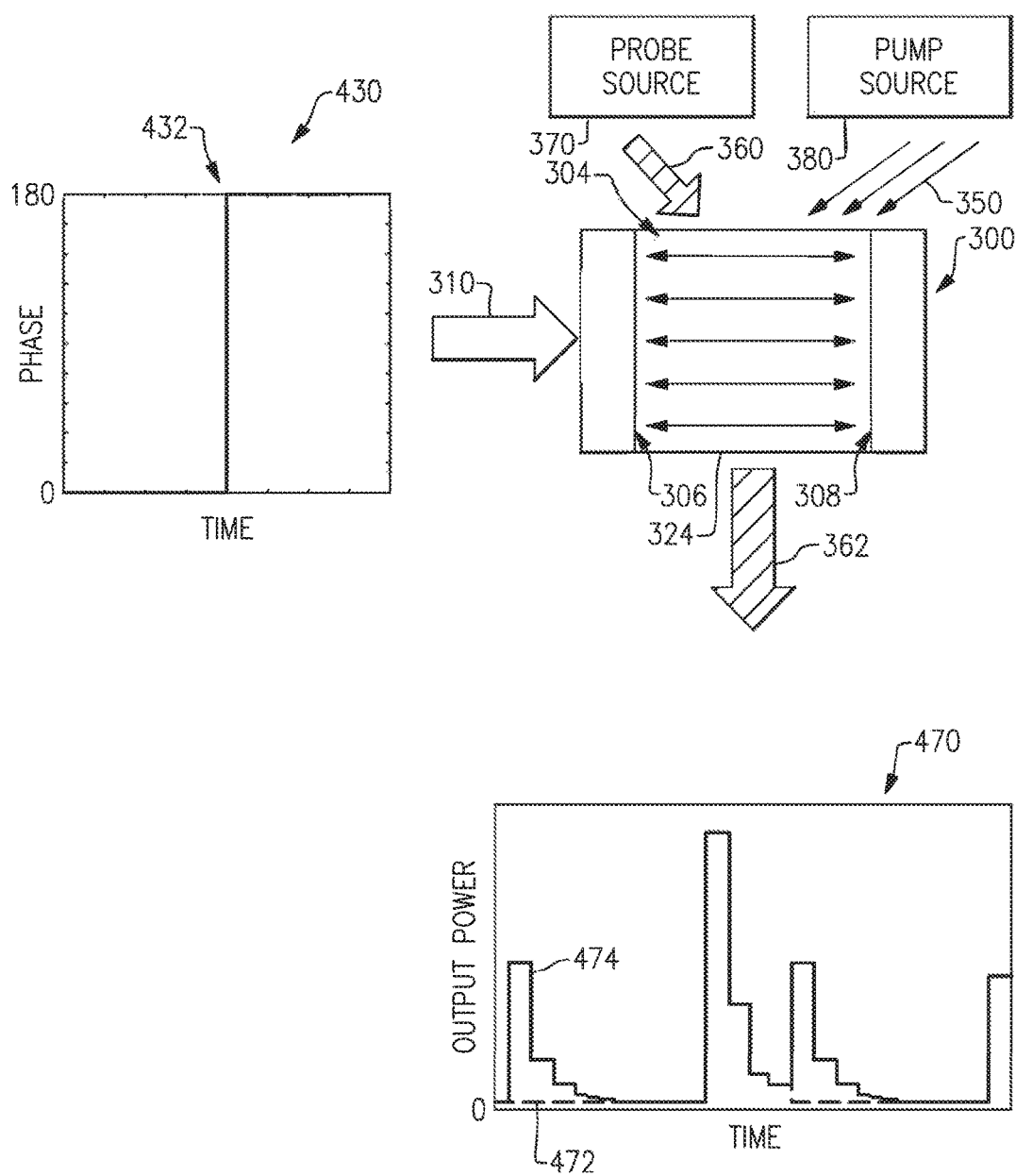
FIG. 4B is a schematic diagram of the optical resonator illustrated in FIG. 3B, including a graph of received signal phase and a graph of output intensity of the probe beam, according to various examples described herein.

Referring to FIG. 4B, illustrated a schematic diagram of the optical resonator illustrated in FIG. 3B. FIG. 4B includes a graph of a phase of the optical signal 310 and a graph of an output intensity of the output optical probe beam 362. In FIG. 4B, the output power plot 470 illustrates two traces of the output optical probe beam 454 intensity (as output power). The first trace 472 represents the output optical probe beam 362 intensity when the optical medium 324 is continuously excited by the pump source 380, and the second trace 474 represents the output optical probe beam 362 intensity when the optical medium 324 is selectively excited by the pump source 380, e.g., via the described pulsed optical pump beam. As demonstrated by a comparison of the first trace 472 to the second trace 474, the output optical probe beam 362 intensity returns to the zero value (i.e., the fully or mostly absorbed state) faster and at a "sharper" transition when the optical medium 324 is excited by the optical pump beam.

Figure 5:
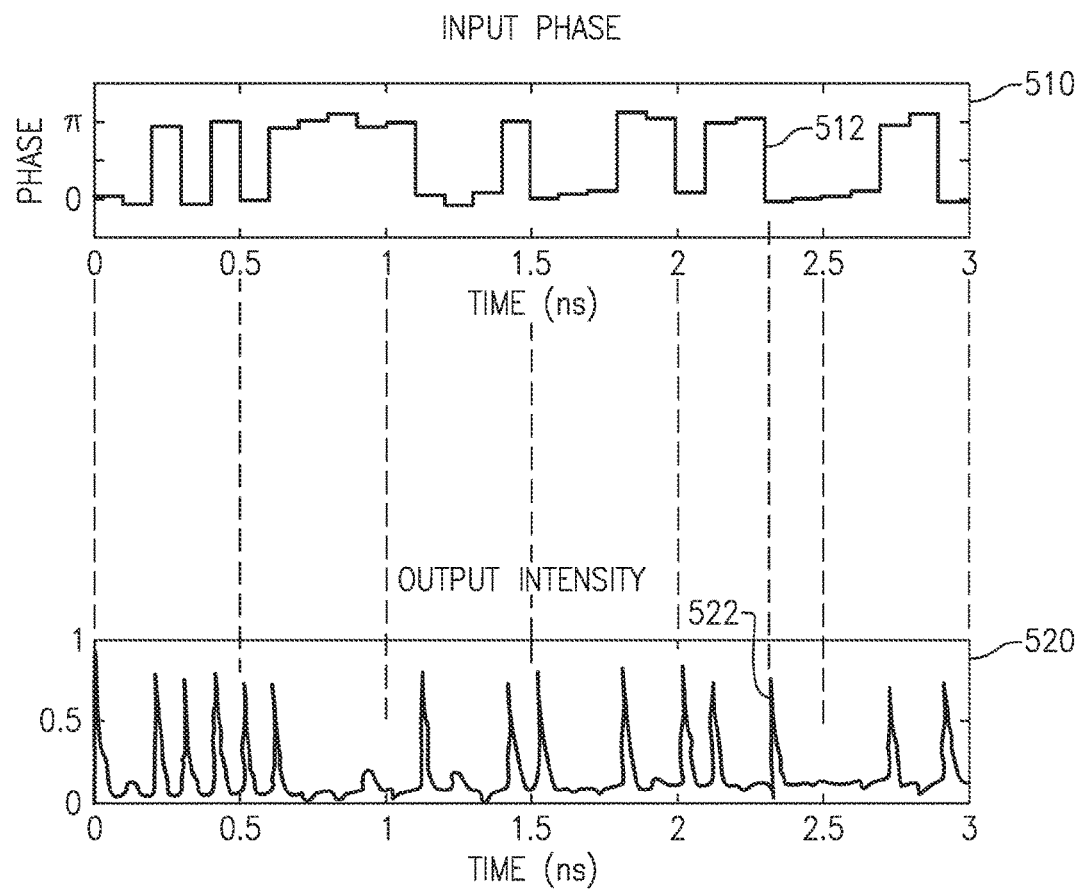
FIG. 5 is a graph of optical input phase and output probe beam intensity from an example of the optical resonator of FIG. 3A.

FIG. 5 illustrates a plot 510 of varying phase of a received phase modulated optical signal, and a plot 520 of the resulting intensity of an output optical probe beam from an optical resonator such as the optical resonator 300 illustrated in FIG. 3A. The results shown in FIG. 5 are for an etalon having a length of 18 μm and with reflectance of 0.999 at a first semi-reflective surface and reflectance of 0.985 at a second semi-reflective surface. The otherwise continuous input phase (shown in the plot 510) changes at intervals according to the modulated information content, and the plot 510 can be seen as a sequence of binary data, such as high and low bits corresponding to ones and zeros, for example. Among the multiple phase transitions shown in the plot 510, a phase transition 512 is specifically associated with a change 522 (e.g., increase) in output intensity, shown in the plot 520. Each phase variation in the received optical signal causes a respective change in the intensity of the output optical probe beam. Accordingly, a receiver can track the changes in intensity of the output optical probe beam and thereby recover the information content of the received phase modulated optical signal.

Optical resonators, such as etalons, used to demodulate or convert optical signal modulations into intensity modulated output signals, as discussed herein, may be manufactured with significant aperture area to receive light signals, and may receive and operate on received light across a large aperture, such that portions of the light in one region of the aperture area may have varying phase relationship to other portions of the light received at other regions of the aperture area. The portions of light received at various regions may be operated on by the etalon essentially independently of each other. Light received at a first region of the etalon's aperture may be converted to intensity variations at an associated first output region, and light received at a second region of the aperture may be independently converted to intensity variations at an associated second output region, without interaction of the relative phases of the light arriving at each region. Accordingly, wavefront correction may not be required. Phase or other variations in any number of differing regions of the etalon's aperture may be simultaneously detected and converted into output intensity modulations at each of a respective output region. Such may be beneficial when the optical signal arriving at a receiver has propagated through a medium that causes wavefront variation.

Figure 6:
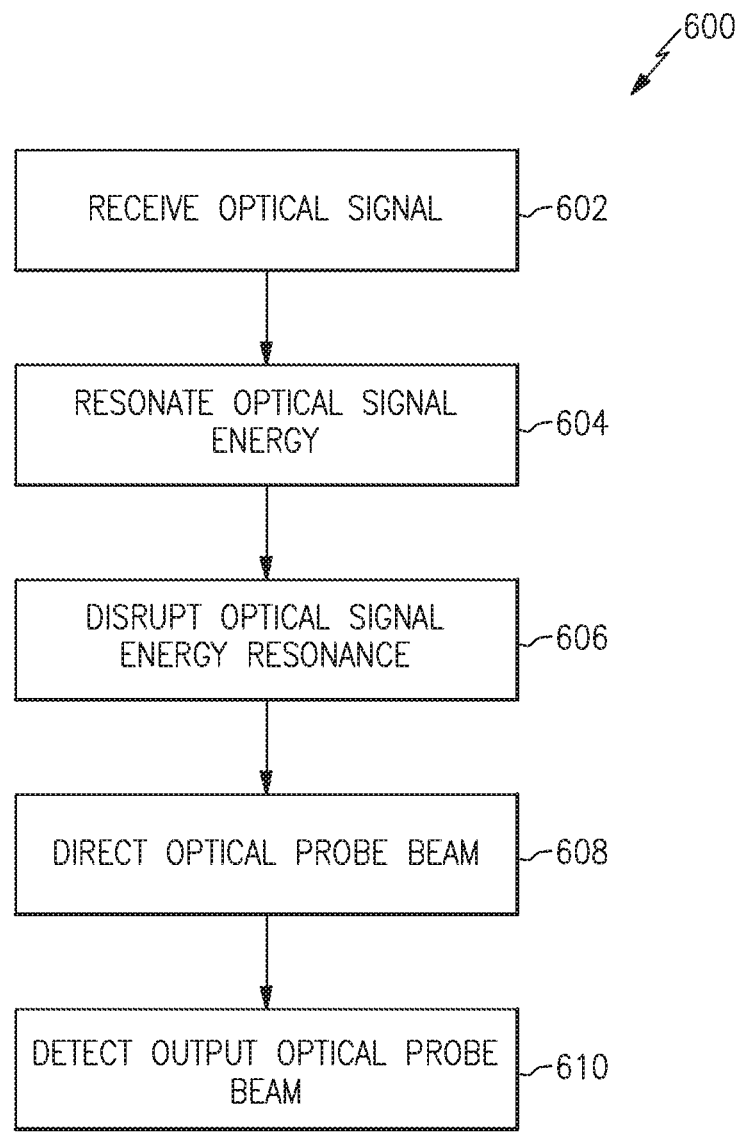
FIG. 6 is a process flow of a method for operating an optical signal receiver, according to various examples described herein.

As discussed above, various examples perform processes that improve known techniques for demodulating a phase-encoded optical signal. In some examples, these processes are executed by an optical receiver, such as the optical receiver 200 described above with reference to FIG. 2. In particular examples, the optical receiver may include an optical resonator, such as the optical resonator 300 described with reference to FIGS. 3A and 3B. One example of a process for operating an optical receiver to receive information encoded in an optical signal is illustrated in FIG. 6. FIG. 6 is described with continuing reference to the optical resonator 300 illustrated in FIGS. 3A and 3B, and the components thereof. In various examples, the process 600 may include receiving an optical signal at the optical resonator 300, resonating optical signal energy in the optical resonator 300, disrupting the optical signal energy resonance, directing the optical probe beam 360 at the optical resonator 300, and detecting at least an emitted portion of the optical probe beam 360 from the optical resonator 300.

In act 602, the process 600 may include receiving an optical signal (e.g., optical signal 310) at the first semi-reflective surface 306 of the optical resonator 300. For instance, the optical resonator 300 may receive an optical signal transmitted along a free space signal path (e.g., free space optical, FSO), a fiber coupling, or another waveguide system by the optical transmitter 100 of FIG. 1. As described herein, in some examples, the surfaces 306, 308 of the optical resonator 300 are semi-reflective and also semi-transmissive. Accordingly, in some examples, act 602 includes, directing the received optical signal 310 into the optical resonator 300 (i.e., between the pair of semi-reflective surfaces 306, 308) with the first semi-reflective surface 306.

In act 604, the process 600 may include resonating optical signal energy in the optical medium 324 interposed between the first semi-reflective surface 306 and the second semi-reflective surface 308 of the optical resonator 300. That is, in various examples, the arriving optical signal 310 allowed into the optical resonator 300 (i.e., between the pair of semi-reflective surfaces 306, 308) may resonate inside the optical resonator 300 and between the pair of semi-reflective surfaces 306, 308. In act 604, the optical signal 310 received by the optical resonator 230 may establish a steady-state energy-preserving condition in which the optical signal 310 continuously arrives at the optical resonator 300 and accumulates or adds to build-up resonating optical signal energy inside the optical resonator 300.

In act 606, the process 600 may include disrupting the optical signal energy resonance in response to a variation in the received optical signal 310. As discussed, a variation in the arriving phase, frequency, or amplitude of the optical signal 310 may disrupt the optical signal energy resonating inside the optical resonator 300. In particular, in act 606, a phase modulation may occur in the received optical signal 310, which causes destructive interference inside the optical resonator 300 and a disruption of the resonating optical signal energy.

In act 608, the process 600 may include directing the optical probe beam 360 to the optical medium 324 of the optical resonator 300. As discussed, when the optical resonator 300 is in the steady-state condition, the received optical probe beam 360 causes a non-linear absorption or interaction process which interrupts (e.g., absorbs) all or most of the optical probe beam 360. However, when a variation in the received optical signal 310 occurs, such as a phase transition in the received optical signal 310, the non-linear absorption process decreases, and at least a portion of the optical probe beam 360 is emitted (e.g., transmitted) by the optical resonator 300. That is, in various examples, the destructive interference inside the optical resonator 300 further causes a disruption in the non-linear absorption process, and a least a portion of the received optical probe beam 360 is transmitted by the optical medium 324.

Accordingly, in various examples, the process 600 may include detecting the portion of the optical probe beam 360 transmitted by the optical medium 324 (i.e., the output optical probe beam 362), and determining a characteristic of the variation in the received optical signal 310 based on the portion of the optical probe beam 360 transmitted by the optical medium 324 (act 610). A large phase transition in the arriving optical signal 310, for example, causes a large (but temporary) intensity increase in the emerging output optical probe beam 362. The emerging output optical probe beam 362 may therefore carry the same information content as the arriving optical signal 310, but in intensity modulated form.

While not explicitly illustrated or described with reference to the process flow illustrated in FIG. 6, in various examples the process 600 may include additional acts or sub-acts. For instance, the process 600 may include one or more acts of exciting the optical medium 324 to the threshold of non-linear absorption with a pump source. Such acts and sub-acts are described herein with reference to at least FIGS. 2, 3, 4A, 4B, and 5.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

As discussed above with reference to FIGS. 1 and 2, in various examples components of the transmitter 100 and/or receiver 200 may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 7:
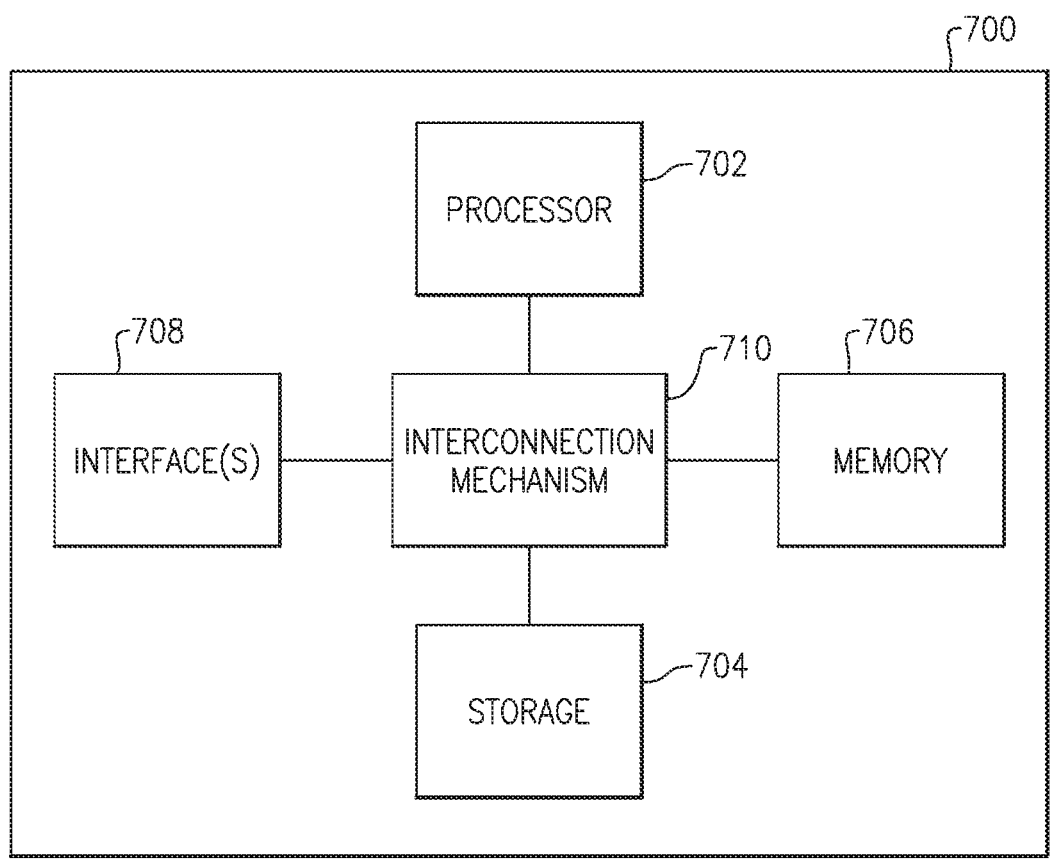
FIG. 7 is a functional block diagram of an example of a computing system that may be configured to implement various examples of the processes described herein.

FIG. 7 illustrates one example of a computing system 700 that may implement software routines corresponding to a control circuit or module, the FEC module 104, the spreading module 106, the mapping module 108, as illustrated in FIG. 1, and/or other components. The computing system 700 may further implement software routines corresponding to the correlator 252 and/or the code generator 254 associated with the digital processing subsystem 250 of FIG. 2 and/or other components of a receiver 200. The computing system 700 may include a processor 702, data storage 704, a memory 706, and one or more interfaces 708, such as a system interface and/or a user interface. While not explicitly illustrated in FIG. 7, in certain examples the computing system 700 may be coupled to a power source. The power source may deliver power to one or more components of the computing system 700, as well as other components of the optical transmitter 100 or optical receiver 200.

In FIG. 7, the processor 702 is coupled to the data storage 704, memory 706, and the various interfaces 708. The memory 706 stores programs (e.g., sequences of instructions coded to be executable by the processor 702) and data during operation of the computing system 700. Thus, the memory 706 may be a relatively high performance, volatile, random access memory such as a dynamic random access memory ("DRAM") or static memory ("SRAM"). However, the memory 706 may include any device for storing data, such as a disk drive or other nonvolatile storage device. Various examples may organize the memory 706 into particularized and, in some cases, unique structures to perform the functions disclosed herein. These data structures may be sized and organized to store values for particular data and types of data.

The data storage 704 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 702 to perform any of the functions described herein.

In various examples, the computing system 700 includes several interface components 708, such as a system interface and/or a user interface. Each of the interface components 708 is configured to exchange, e.g., send or receive, data with other components of the computing system 700 (and/or associated transmitter or receiver), or other devices in communication with the computing system 700. According to various examples, the interface components 708 may include hardware components, software components, or a combination of hardware and software components.

In certain examples, components of the system interface couples the processor 702 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the computing system 700 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 700. Data received at the various interfaces may be provided to the processor 702, as illustrated in FIG. 7. Communication coupling (e.g., shown interconnection mechanism 710) between the processor 702, memory 706, data storage 704, and interface(s) 708 may be implemented as one or more physical busses in conformance with standard, proprietary, or specialized computing bus technologies.

The processor 702 performs a series of instructions that result in manipulated data that is stored in and retrieved from the data storage 704, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 702 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 702 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
    an optical resonator configured to receive an optical signal and including an optical medium configured to produce optical signal energy resonance based at least in part on the received optical signal, the optical resonator being further configured to disrupt the optical signal energy resonance in response to a variation in the received optical signal;
    a probe source positioned to provide an optical probe beam to the optical medium, the optical medium being configured to interrupt the optical probe beam during the optical signal energy resonance and to transmit at least a portion of the optical probe beam in response to the disruption of the optical signal energy resonance; and
    a detector positioned to detect the portion of the optical probe beam transmitted by the optical medium.

2. The optical signal receiver of claim 1, wherein the detector is further configured to determine a characteristic of the variation in the received optical signal based on detection of the portion of the optical probe beam transmitted by the optical medium.

3. The optical signal receiver of claim 2, wherein the detector is configured to determine the characteristic of the variation in the received optical signal based at least in part on a change in an intensity of the portion of the optical probe beam transmitted by the optical medium.

4. The optical signal receiver of claim 3, wherein the change in the intensity of the portion of the optical probe beam transmitted by the optical medium is a temporary spike in the intensity.

5. The optical signal receiver of claim 3, wherein the variation in the received optical signal is a variation in a phase of the received optical signal.

6. The optical signal receiver of claim 1, wherein the optical medium is a non-linear optical medium, the optical signal receiver further comprising a pump source coupled to the optical medium and configured to excite the optical medium to a threshold of non-linear absorption or non-linear interaction.

7. The optical signal receiver of claim 6, wherein the pump source is an optical source optically coupled to the optical medium and configured to direct a pump beam at the optical medium.

8. The optical signal receiver of claim 7, wherein the pump beam is a pulsed pump beam.

9. The optical signal receiver of claim 1, wherein the optical resonator is further configured to restore the optical signal energy resonance in response to a stabilization in the received optical signal, the optical medium being configured to interrupt the optical probe beam during the restored optical signal energy resonance.

10. The optical signal receiver of claim 1 wherein the optical resonator further includes:
   a first semi-reflective surface positioned to receive the optical signal; and
   a second semi-reflective surface positioned to face the first semi-reflective surface;
   wherein the optical medium is interposed between the first semi-reflective surface and the second semi-reflective surface, the first semi-reflective surface, the second semi-reflective surface, and the optical medium being configured to resonate optical signal energy in the optical medium based at least in part on the received optical signal such that the optical medium produces the optical signal energy resonance.

11. A method of receiving information encoded in an optical signal, the method comprising:
   receiving an optical signal at an optical resonator;
   resonating optical signal energy in an optical medium of the optical resonator based at least in part on the received optical signal to produce an optical signal energy resonance;
   disrupting the optical signal energy resonance in response to a variation in the received optical signal;
   directing an optical probe beam to the optical medium, the optical medium interrupting the optical probe beam during the optical signal energy resonance and transmitting at least a portion of the optical probe beam in response to the disruption of the optical signal energy resonance; and
   detecting the portion of the optical probe beam transmitted by the optical medium.

12. The method of claim 11, further comprising determining a characteristic of the variation in the received optical signal based on detection of the portion of the optical probe beam transmitted by the optical medium.

13. The method of claim 12, wherein determining the characteristic of the variation in the received optical signal includes detecting a change in an intensity of the portion of the optical probe beam transmitted by the optical medium.

14. The method of claim 13, wherein the change in the intensity of the portion of the optical probe beam transmitted by the optical medium is a temporary spike in the intensity.

15. The method of claim 14, wherein the variation in the received optical signal is a variation in a phase of the received optical signal.

16. The method of claim 11, further comprising exciting the optical medium to a threshold of non-linear absorption or non-linear interaction, the optical medium being a non-linear optical medium.

17. The method of claim 16, wherein exciting the optical medium includes directing a pump beam at the optical medium with an optical source.

18. The method of claim 17, wherein the pump beam is a pulsed pump beam.

19. The method of claim 11, further comprising restoring the optical signal energy resonance following the disruption to the optical signal energy resonance and in response to a stabilization in the received optical signal, the optical probe beam being interrupted by the optical medium during the restored optical signal energy resonance.

* * * * *